US010375095B1

(12) United States Patent
Turcotte et al.

(10) Patent No.: US 10,375,095 B1
(45) Date of Patent: Aug. 6, 2019

(54) MODELING BEHAVIOR IN A NETWORK USING EVENT LOGS

(71) Applicants: Triad National Security, LLC, Los Alamos, NM (US); IP2IPO Innovations Limited, London (GB)

(72) Inventors: Melissa J. M. Turcotte, Los Alamos, NM (US); Nicholas A. Heard, Kent (GB); Alexander D. Kent, Los Alamos, NM (US)

(73) Assignees: Triad National Security, LLC, Los Alamos, NM (US); IP2IPO Innovations Limited, London (GB)

( * ) Notice: Subject to any disclaimer, the term of this patent is extended or adjusted under 35 U.S.C. 154(b) by 272 days.

(21) Appl. No.: 15/355,142

(22) Filed: Nov. 18, 2016

Related U.S. Application Data

(60) Provisional application No. 62/258,185, filed on Nov. 20, 2015.

(51) Int. Cl.
  *H04L 29/06* (2006.01)
(52) U.S. Cl.
  CPC ...... *H04L 63/1425* (2013.01); *H04L 63/1416* (2013.01); *H04L 67/42* (2013.01)
(58) Field of Classification Search
  None
  See application file for complete search history.

(56) References Cited

U.S. PATENT DOCUMENTS

| | | | | |
|---|---|---|---|---|
| 6,769,066 B1* | 7/2004 | Botros | ............... | G06F 21/55 700/110 |
| 8,312,540 B1* | 11/2012 | Kahn | ............... | G06F 21/552 713/183 |
| 9,043,905 B1* | 5/2015 | Allen | ............... | H04L 63/1441 726/22 |
| 9,104,961 B2* | 8/2015 | Gordon | ............... | G06N 7/005 |
| 9,378,364 B1* | 6/2016 | Weast | ............... | G06F 21/55 |
| 9,516,053 B1* | 12/2016 | Muddu | ............... | G06F 16/254 |
| 9,641,544 B1* | 5/2017 | Treat | ............... | H04L 63/1425 |
| 10,015,178 B2* | 7/2018 | Schulman | ............... | H04L 63/1416 |
| 10,015,182 B1* | 7/2018 | Shintre | ............... | H04L 63/1425 |
| 2008/0250497 A1* | 10/2008 | Mullarkey | ............... | H04L 41/142 726/22 |
| 2010/0094767 A1* | 4/2010 | Miltonberger | ............... | G06Q 10/067 705/325 |
| 2010/0146622 A1* | 6/2010 | Nordstrom | ............... | G06F 21/316 726/23 |
| 2010/0198761 A1* | 8/2010 | Meng | ............... | G06N 7/005 706/12 |
| 2011/0106743 A1* | 5/2011 | Duchon | ............... | G06F 17/30705 706/46 |
| 2011/0319094 A1* | 12/2011 | Usui | ............... | G01S 5/0027 455/456.1 |

(Continued)

*Primary Examiner* — Michael R Vaughan
(74) *Attorney, Agent, or Firm* — LeonardPatel PC; Michael Aristo Leonard, II; Sheetal Suresh Patel

(57) ABSTRACT

A framework is provided for modeling the activity surrounding user credentials and/or machine level activity on a computer network using computer event logs by viewing the logs attributed to each user as a multivariate data stream. The methodology performs well in detecting compromised user credentials at a very low false positive rate. Such a methodology may detect both users of compromised credentials by external actors and otherwise authorized users who have begun engaging in malicious activity.

20 Claims, 10 Drawing Sheets

(56) References Cited

U.S. PATENT DOCUMENTS

| | | | | |
|---|---|---|---|---|
| 2013/0318603 | A1* | 11/2013 | Merza | H04L 63/1441 |
| | | | | 726/22 |
| 2013/0326620 | A1* | 12/2013 | Merza | H04L 63/1408 |
| | | | | 726/22 |
| 2014/0068769 | A1* | 3/2014 | Neil | H04L 63/1433 |
| | | | | 726/23 |
| 2015/0127670 | A1* | 5/2015 | Torman | G06F 17/30345 |
| | | | | 707/755 |
| 2015/0304346 | A1* | 10/2015 | Kim | H04L 63/1408 |
| | | | | 726/23 |
| 2016/0021141 | A1* | 1/2016 | Liu | H04L 63/1433 |
| | | | | 726/23 |
| 2016/0142270 | A1* | 5/2016 | DeLuca | H04L 67/22 |
| | | | | 709/224 |
| 2016/0308884 | A1* | 10/2016 | Kent | G06K 9/6277 |
| 2017/0063886 | A1* | 3/2017 | Muddu | H04L 63/1425 |
| 2017/0140141 | A1* | 5/2017 | Yan | G06F 21/32 |
| 2017/0223036 | A1* | 8/2017 | Muddu | G06F 16/254 |
| 2018/0027006 | A1* | 1/2018 | Zimmermann | H04L 63/0245 |
| | | | | 726/11 |
| 2018/0069867 | A1* | 3/2018 | Grajek | G06N 20/00 |
| 2018/0316707 | A1* | 11/2018 | Dodson | H04L 63/1425 |

\* cited by examiner

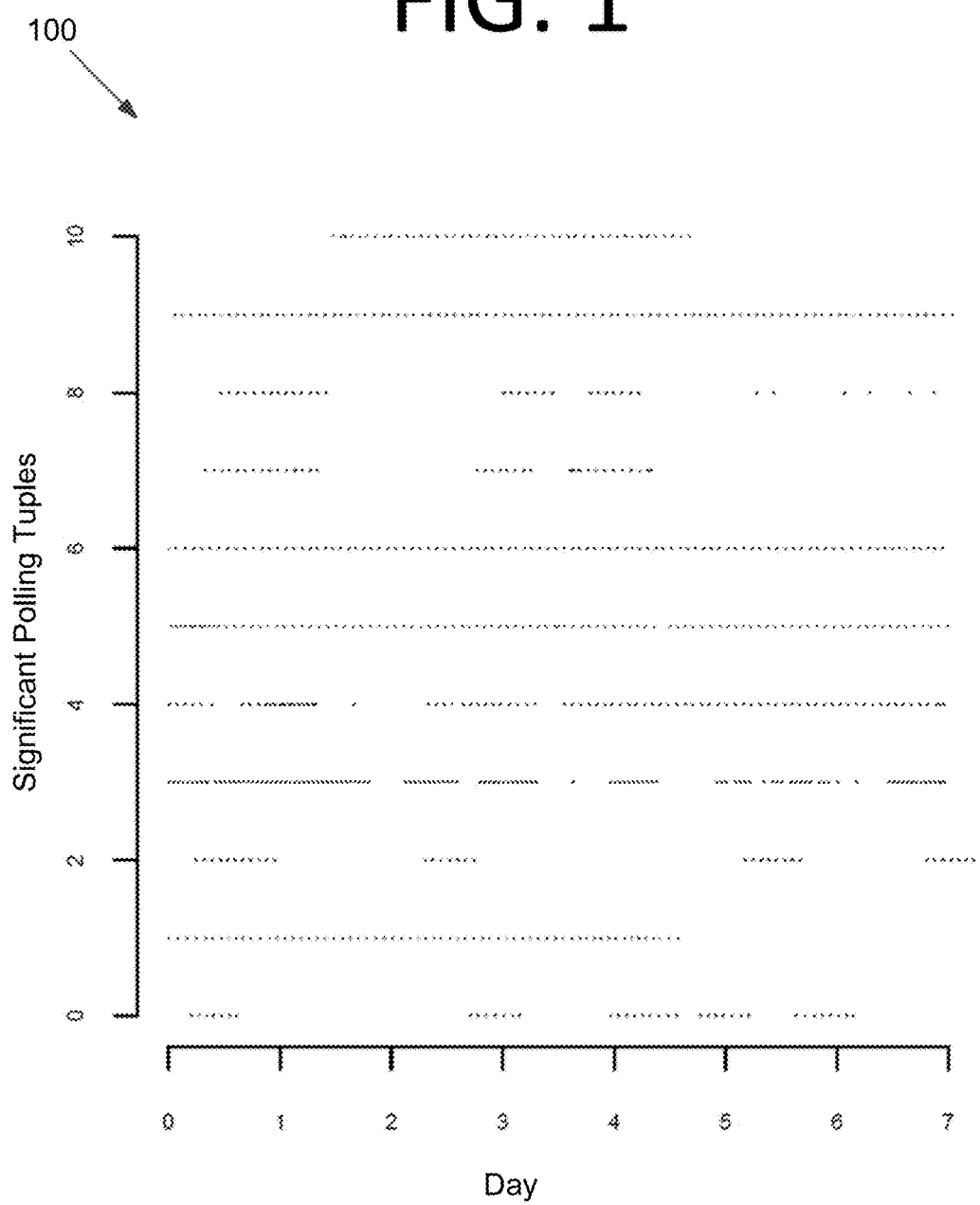

MODELING BEHAVIOR IN A NETWORK USING EVENT LOGS

CROSS REFERENCE TO RELATED APPLICATION

This application claims the benefit of U.S. Provisional Patent Application Ser. No. 62/258,185 filed Nov. 20, 2015. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to cybersecurity, and more particularly, to statistical modeling of user credentials on a network using data generated by computing system event logs.

BACKGROUND

In an enterprise network, event logs from individual computers can be a valuable data resource to detect malicious activity. Most modern operating systems can record computer events. These events can be collected for a wide range of activities occurring within the network, providing a rich data source. The events can include authentication activity of user credentials in the network, as well as process and application data generated on each computer. There are many rule-based approaches to detecting security incidents, but little is currently done with statistical modeling of event logs for anomaly detection.

One important research problem associated with this data is identifying user credential theft or misuse. After the initial compromise of a computer, in order for adversaries to move through the network, they typically need to gain access to user credentials. Currently, this is surprisingly simple. For instance, an attacker can relatively easily obtain and reuse credentials in a network via "pass-the-hash" or "pass-the-ticket" attacks. "Single sign-on" is prevalent in most Microsoft™ network domains and is meant to improve user experience and prevent users from repeatedly typing in their password. However, this means that attackers can recover credentials and passwords stored in memory on the computer. Typically, attackers will continue to steal credentials so that they can escalate their privileges within the network, depending on their ultimate goal.

Another scenario of interest is the misuse of genuine credentials. In light of recent events, such as the exfiltration of highly classified documents from the U.S. National Security Agency (NSA) by Edward Snowden and the many insider trading occurrences within the financial industry, identifying credential misuse has become increasingly important to both government and industry. Accordingly, an improved approach to cybersecurity may be beneficial.

SUMMARY

Certain embodiments of the present invention may provide solutions to the problems and needs in the art that have not yet been fully identified, appreciated, or solved by conventional cybersecurity solutions. For example, some embodiments pertain to modeling behavior in a network using Bayesian statistical models derived from computing system event logs.

In an embodiment, a computer-implemented method includes independently considering a time series of events generated by a plurality of user credentials, by a computing system. The computer-implemented method also includes fitting conjugate Bayesian models to the time series of events, by the computing system, for each of the plurality of user credentials. The computer-implemented method further includes checking, by the computing system, whether an event generated for a given user credential is anomalous with respect to the respective Bayesian model for that given user. Additionally, the computer-implemented method includes, when the event for the given user credential is anomalous, flagging the given user credential as associated with anomalous behavior, by the computing system.

In another embodiment, a computer-implemented method includes independently considering, by a computing system, a time series of machine level events generated by a plurality of computing systems in a network. The computer-implemented method also includes fitting Bayesian models to the time series of events, by the computing system, for each of the plurality of computing systems in the network. The computer-implemented method further includes checking, by the computing system, whether an event generated for a given computing system is anomalous with respect to the fitted Bayesian model. Additionally, the computer-implemented method includes, when the event is anomalous, flagging the computing system associated with the anomalous event as exhibiting anomalous behavior.

In yet another embodiment, a computer-implemented method includes independently considering, by a computing system, a time series of events generated by a plurality of user credentials and a plurality of computing systems in a network. The computer-implemented method also includes fitting Bayesian models to the time series of events for each of the plurality of user credentials and each of the plurality of computing systems in the network. The computer-implemented method further includes checking, by the computing system, whether an event generated for a given user credential or a given computing system of the plurality of computing systems is anomalous with respect to the fitted Bayesian model. Additionally, the computer-implemented method includes, when the event is anomalous, flagging, by the computing system, the given user credential or the given computing system of the plurality of computing systems as associated with anomalous behavior.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a graph illustrating event times for tuples that were determined to have significant polling behavior over the course of a week, according to an embodiment of the present invention.

DETAILED DESCRIPTION OF THE EMBODIMENTS

Figure 2A:
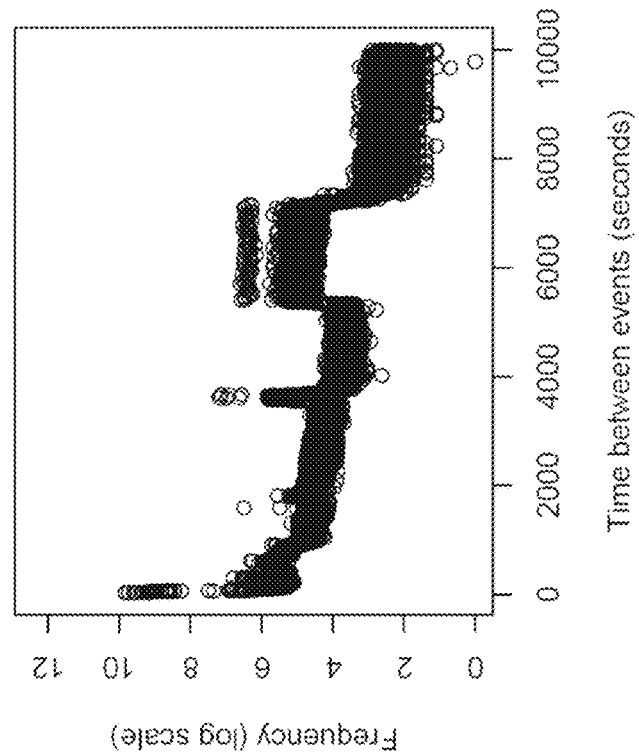
FIG. 2A is a graph illustrating frequency of the time between events for each unique tuple (user, edge, event type) for all of the data on the log scale, according to an embodiment of the present invention.

Some embodiments of the present invention pertain to modeling user credential patterns on the network by independently considering the time series of events generated by each user credential. Bayesian models may be fit to the event data for each user credential, providing a flexible global framework for monitoring credentials on an enterprise network and identifying potentially compromised credentials. Statistical models may be used to identify when user credentials are being used maliciously using computer event log data.

In some embodiments, user behavior profiles are modeled in a sequential time frame so that events are scored in real time. Probability models of normal behavioral patterns are built for each user credential in some embodiments based on network usage recorded through the computer event logs. The sequence of events may be viewed as a multivariate stream of data, where each event includes multiple variables associated with the event. Conjugate Bayesian models may be constructed for this stream, providing a flexible framework with relatively simple updating schemes. p-values may then be obtained for each event, indicating the probability of observing an event equal to or "more extreme" than what was actually observed under the hypothesis that the user is behaving normally. This enables detection of potentially compromised user credentials.

Furthermore, a control chart of these scores may be used to accumulate evidence of anomalous behavior over time. Analysts may also set the alarm threshold to be appropriately sensitive for their organization to control the false alarm rate. In certain embodiments, since a user may change rapidly for legitimate reasons, such as due to a new role in the organization, only data within a certain time frame (e.g., the past few weeks, past three months, etc.) may be taken under consideration when modeling normal user behavior so that behavior before the change is not incorporated into the model.

In certain embodiments, this methodology can also be extended to the machine level (i.e., individual computing systems) by modeling the time series of events generated by each computing system in the network rather than modeling the time series of events generated by each user credential. The same underlying model can be used for both scenarios. The methodology may be applied to activity logs for user credentials, an individual machine, or both. An advantage of this is that there is considerable activity on the machine level that is not tied to individual credentials, such as process events, scheduled tasks, service starts and stops, etc. Hence, modeling individual machines would extend the breadth of monitoring within the network.

The models of some embodiments may be extremely adaptable and may be used to monitor very different types of computer networks, as in practice, collected computer event logs may depend heavily on the administrative settings in the network and the type of network, as the categories of event types that are logged are specified by computer network administrators and the network policies. Further, the types of events that are of interest to security professionals may vary across computer networks and businesses, so it may be desirable to build flexible models that can be tailored to specific networks. The models may also be parallelizable so that each user credential or individual machine can be monitored independently, decreasing the computational burden.

Computer Log Data Set

The data set used for the example analysis herein is from the internal collection of event logs from computers running the Microsoft Windows™ operating system on Los Alamos National Laboratory's (LANL's) enterprise computer network over a period of two months. The data is available at http://csr.lanl.gov/data/cyber1/. However, this data is used for illustrative purposes only, and embodiments may be applied to many other user credential sets from other networks with similar or different characteristics without deviating from the scope of the invention.

In this example, all computer event logs generated from local computer accounts were removed with the aim of modeling user credentials that are largely human-driven. Events associated with account logoffs were also removed. Note that this event type would be interesting if the duration of sessions were being modeled, as each logoff event can be mapped to an associated account logon. However, this modeling is not used in some embodiments, and is not described in further detail herein.

Within the second month of data, there is a set of 78 known credentials that were compromised during a month-long red team exercise within the LANL network. For the purposes of testing the methodology described herein, a random selection of approximately 1,000 user credentials out of total number of 10,759 user credentials was analyzed along with the 78 known compromised credentials.

Events that are associated with authentication activity are commonly directed, as a user authenticates from a client X to a server Y. For each event log associated with a user credential U, the variables X for the client computing system, Y for the server computing system, and the event type E were modeled. For local events, such as screen unlocks and process events, there will not be any variable associated with the server. For some event types, it may be desirable to include additional variables that provide further information about that event type. For example, in process-start events, there is an associated field describing the process which has started on the computer. Although extra variables relating to specific event types are not modeled here, the methodology in some embodiments can be extended to incorporate event variables that have varying dimensions depending on the event type without deviating from the scope of the invention.

All duplicate logs events, where the time stamp, user, client, server, and event type were all identical to a previous log, were removed. Some of the duplicate events exist due to the event being recorded on multiple computers in the network. In this case, due to clock skew from the event log sources, the time stamps for the same underlying event may be slightly different. For this reason, events that occurred within 30 seconds of an identical event were also removed. Furthermore, events where the client was masked by an intermediary, such as a virtual private network (VPN) aggregator, terminal server, or proxy, were also removed since these logs can otherwise be the cause of many false alarms from the models.

Each unique tuple (U, X, Y, E) has an associated time series of event times, and for some of these tuples, the time series exhibits strong periodic behavior corresponding to automated events rather than events driven by human behavior. Removing automated behavior from the data is important for the statistical modeling of normal user behavior in some embodiments. More specifically, tuples that are largely periodic in nature are determined and removed. Automated behavior in network traffic may be detected by applying a Fourier analysis to the time series observed along each edge in a computer network. This analysis can be readily applied to the authentication event time series for each unique tuple.

After analyzing all unique tuples using this methodology, 7% were determined to have significant periodic behavior, and these tuples were removed from the data. Graph 100 of FIG. 1 shows a collection of tuples that exhibited periodic or automated behavior, with regular spacing between event times. For tuple 0, it can readily be seen that an initial, possibly human-driven event triggers a sequence of further automated events. In such cases, rather than removing the tuple altogether, it may be desirable to separate the human-driven events from the automated ones.

Figure 2B:
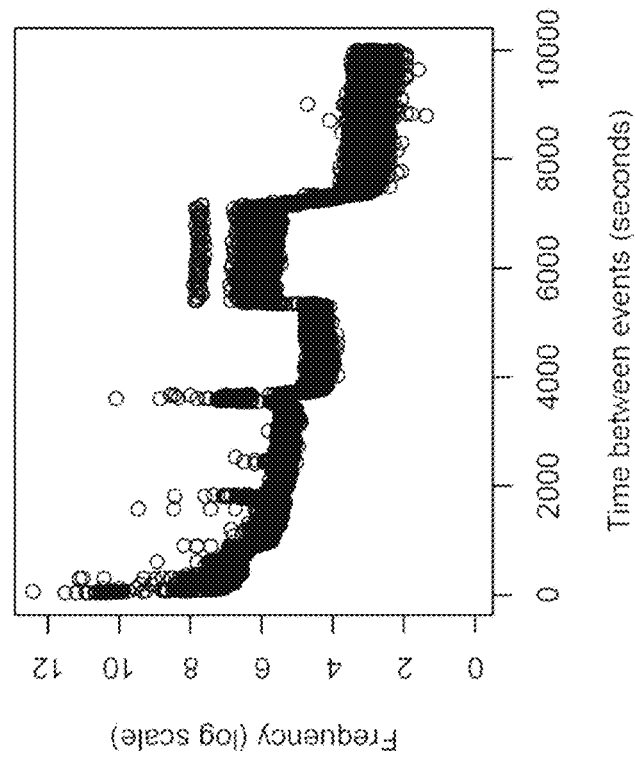
FIG. 2B is a graph illustrating frequency of the time between events for each unique tuple after removing tuples that were determined to be automated on the log scale, according to an embodiment of the present invention.

Graphs 200, 210 of FIGS. 2A and 2B show the frequency of the observed time between events for each unique tuple before and after removal of the periodic events, respectively. Although much automated behavior still exists in the data, it is apparent that automated behavior has been reduced. The largest observed frequency of the time between events, which is at 60 seconds, is smaller by an order of magnitude of 400,000.

For the random selection of users chosen for analysis, there were a total of 50,536,677 events across 4,100 computers. After removing events based on the criteria described above, the data set was reduced to a total number of 3,716,619 events, again demonstrating how many automated and duplicate events are present in the original data. Understanding how to separate these kinds of behaviors from user-driven events with computer host event logs is essential in some embodiments.

Figure 3B:
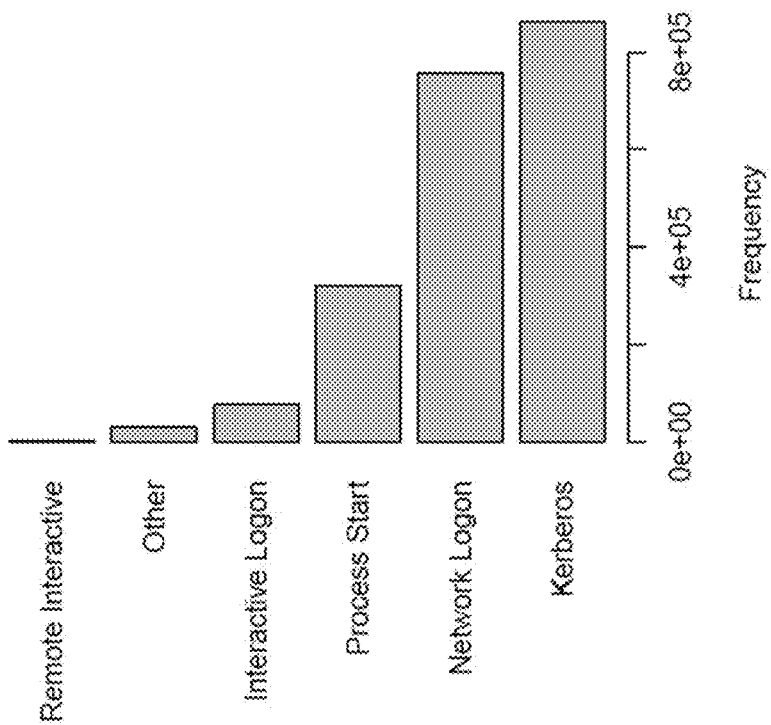
FIG. 3B is a histogram illustrating the number of event types in the specified categories, according to an embodiment of the present invention.
Figure 3A:
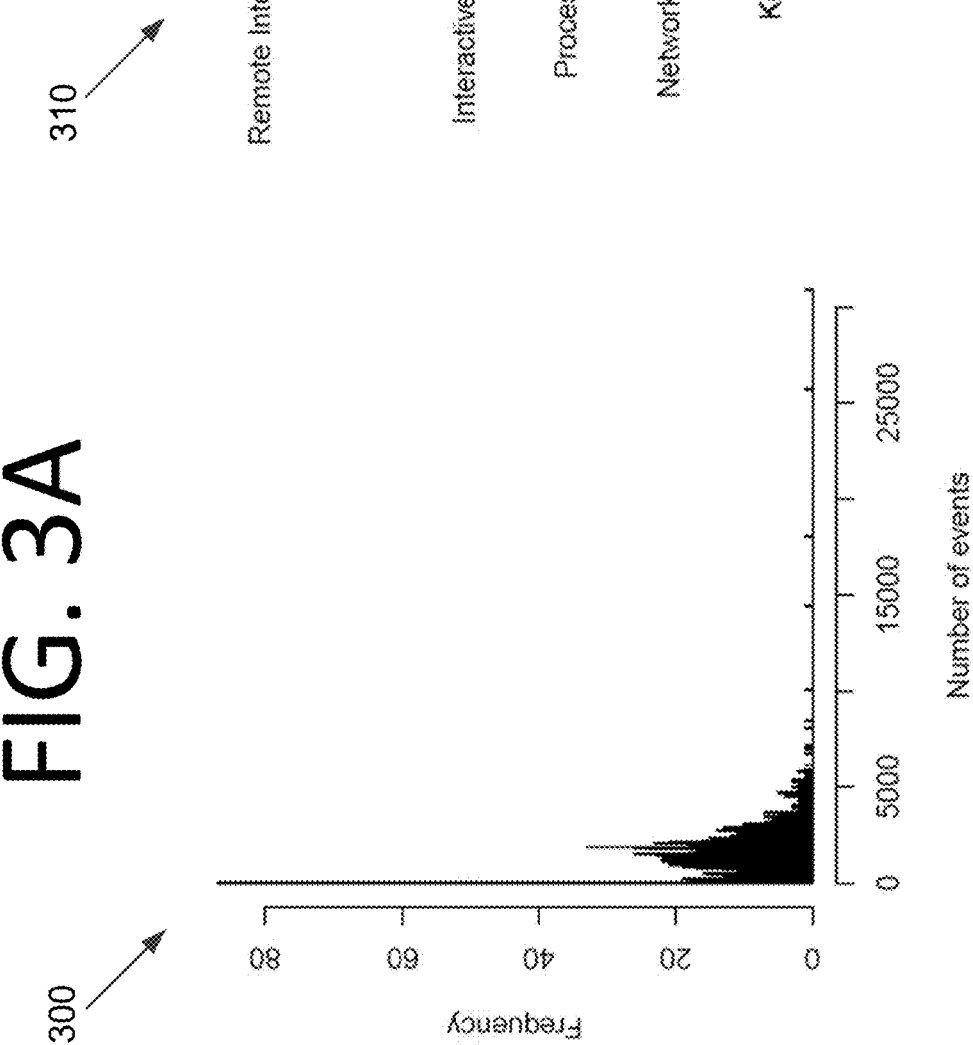
FIG. 3A is a histogram illustrating the number of events generated per user credential, according to an embodiment of the present invention.

FIG. 3A shows a histogram 300 of the number of events generated by each user credential in the reduced data set. Typically, the credentials that have a lower number of events belong to general network users, whereas the credentials generating a higher number of events are administrative user credentials. The remaining automated behavior in the network could probably be attributed to the few users with a very high frequency of events.

FIG. 3B shows a histogram 310 of the frequencies of the different event types in the reduced data set, categorized as Kerberos authentication events including ticket granting ticket requests and service ticket requests, network logons accessing file shares and other miscellaneous remote accesses, process starts, interactive logons (i.e., logon at the keyboard and screen of the computing system, including workstation or screensaver unlocks), remote interactive and remote desktop sessions, and other miscellaneous events, such as credential mapping, service startups, and various others.

This illustrates the types of events that were being collected on the LANL network during the time period for which the data was obtained. Better collection of logs that capture interactive logons would help to identify when a user is on his or her computer, which would be useful when separating automated events from the user-driven ones and would also aid in modeling the times at which events occur in the network as the seasonal behavior could potentially be factored out.

Modeling User Behavior

For this example, it was assumed that there is a separate model for each user credential, and thus notationally, any dependence on the user credential will be dropped. The set of computers in the network is denoted as V. For each user credential, a sequence of events is observed over time $\{(X_t, Y_t, E_t): t=1, 2, \ldots\}$, where $X_t \in V$ is the categorical random variable representing the client, $Y_t \in V$ is the random variable representing the server, and $E_t \in E = \{1, 2, \ldots, 6\}$ is the random variable for the type of event. For the purposes of this example, the focus is on scoring the client, server, and event types that were observed, whereas modeling the event times is the subject of further work. Here, the index t denotes the ordering of the events rather than the time at which they occurred.

A user computer set $V_t \subseteq V$ is defined as the subset of computers in the network that a user has used in some recent past period before time t. The following indicator variables are also defined:

$$Z_t^X = \begin{cases} 1 \Leftrightarrow X_t \in V_t \\ 0 \Leftrightarrow X_t \notin V_t \end{cases}, Z_t^Y = \begin{cases} 1 \Leftrightarrow Y_t \in V_t \\ 0 \Leftrightarrow Y_t \notin V_t \end{cases} \quad (1)$$

Note that over time, $V_t$ may change and how often a user computer set is updated may be guided by a security analyst.

Multinomial-Dirichlet Models

Since the client, server, and event type of a user authentication are all categorical variables, within the Bayesian paradigm, these variables may be most simply modeled by multinomial distributions with conjugate Dirichlet distribution priors for the category probabilities. To address the task of anomaly detection, interest in this example is centered on the predictive distributions from this model pair at each time step. To provide some simple generic notation, suppose a multinomial variable has k categories and the corresponding Dirichlet prior distribution parameters are $\alpha=(\alpha_1, \alpha_2, \ldots, \alpha_k)$, with $\alpha_l>0$ $\forall l$, and $\alpha_\blacksquare$ is defined as $$\alpha_m = \sum_{l=1}^{k} \alpha_l.$$

After time t and observing category counts $c_1, c_2, \ldots, c_k$, the posterior distribution for the category probabilities is again Dirichlet with updated parameters $\alpha^*$ and the predictive probability of the next category being class l is given by $$\alpha_l^*/\alpha_\blacksquare^* \quad (2)$$

where $\alpha_l^*=\alpha_l+c_l$ and $$\alpha_m^* = \sum_{l=1}^{k} \alpha_l^*.$$

Note that explicit dependence on t is being suppressed in this notation for brevity.

Client Modeling

For many computers in a network, an event from that machine as a client can lead to further events from the same client, or a related client, with higher probability. Therefore, the sequence of computer events $\{X_t: t=1, 2, \ldots\}$ for a user is modeled as a Markov Chain with a time-varying state space $V_t$ and transition probability matrix $P_t$. It is assumed here that whenever $Z_t^X=0$ and a new client computer is used, this computer will be added to $V_t$ for all subsequent time points. Alternatively, it may be desirable to relax the assumption that any computer used previously by a user credential is automatically a part of $V_t$ (e.g., perhaps a certain amount of use is required for membership), and even expire computers in $V_t$ if they have not been used for some time period. Between changes over time in $V_t$ (periods for which $Z_t^X$ is always one), the transition probability matrix $P_t$ will be assumed to be constant, with independent Dirichlet prior distributions for each of the rows of $P_t$ to allow the unknown transition probabilities to be integrated out when deriving the predictive distributions.

For simplicity, the arrivals of new clients will be assumed to occur over time with a constant but unknown probability from a Dirichlet($\alpha_Z$) prior distribution. By Eq. (2), the predictive probability of a new client computer being observed at time t is given by $$\mathbb{P}(Z_t^X=0)=(\alpha_{z,0}+c)/(\alpha_{Z,\blacksquare}+t-1) \quad (3)$$

where $c=\sum_{t'<t} \mathbb{1}(Z_{t'}^X=0)$ is the number of observed clients.

When $Z_t^X=0$, representing that a user has used a new client computer for the first time, it may be assumed that $$P(X_t = x | Z_t^X = 0) = \frac{deg^+(x)}{\sum_{\tilde{x} \in V, \tilde{x} \notin V_t} deg^+(\tilde{x})} \quad (4)$$

where $deg^+(x)$ is the number of unique users on the network that have used computer x as a client in some relatively recent past. The reason for choosing this model for new user connections is that intuitively, networked computers with large outdegrees are more likely to have new users connect from them. A more sophisticated model making use of the neighbors (in some topological sense) of the user and computer x is the subject of further work.

When $Z_t^X=1$, meaning the client is drawn from the existing set $V_t$, suppose $X_{t-1}=x'$. The Markov Chain model then assumes an informative Dirichlet prior for the corresponding row of $P_t$, obtained from the usual Bayesian updating equations, satisfying $$\alpha_{x',x}(t) = \alpha_{x',x} + \sum_{t'<t} \mathbb{1}(X_{t'} = x, X_{t'-1} = x') \quad (5)$$

and hence, from Eq. (2), the predictive distribution for the next client is $$P(X_t = x | X_{t-1} = x', Z_t^X = 1) = \frac{\alpha_{x',x}(t)}{\sum_{\tilde{x} \in V_t} \alpha_{x',\tilde{x}}(t)} \quad (6)$$

The full predictive distribution for the next client is then $$P(X_t = x) = \sum_{i=0}^{1} \mathbb{P}(X_t = x | Z_t^X = i)\mathbb{P}(Z_t^X = i) \quad (7)$$

where $\mathbb{P}(X_t=x|Z_t^X=i)$ is given by Eq. (4) and (6).

Server Modeling

The model for the server random variables $\{Y_t: t=1, 2, \ldots\}$ is similar to the client model described above, except that the probabilities for an event being directed to a server $Y_t$ are assumed to depend on the identity of the client $X_t$. The arrival of new servers is allowed to depend on whether a new client is also being used. Let $Z_1^{Y_j}, Z_2^{Y_j}, \ldots$ be the subsequence of $Z_t^Y$ for which $z_t^X=j$, for j=0,1. Then each process $Z^{Y_j}$ is modeled separately according to the same model as Eq. (3) above. This separation has the implication that if a new client is being used, this can affect the probability of a new server also being used, whereas if an existing client is used, the identity of the client is not able to further influence the chance of connecting to a new server.

When the user connects to a new server, corresponding to $z_t^Y=0$, an analogous model to Eq. (4) is used. However, here, this is based on the indegree of the new server. Specifically, $$P(Y_t = y | Z_t^Y = 0) = \frac{deg^-(y)}{\sum_{\tilde{y} \in V, \tilde{y} \notin V_t} deg^-(\tilde{y})} \quad (8)$$

where $deg^-(y)$ is the number of unique users that have used computer y as a server in some relatively recent past.

For each client x, let $\{Y_t^x: t=1, 2, \ldots\}$ be the subsequence of servers $Y_1, Y_2, \ldots$ for which the client was x. Note that the subsequence would be length zero if x is a new client. For contiguous periods for which $Z_t^Y=1$, the subsequences $Y^x$ are modeled as separate Markov Chains for each client x with transition matrix $P_t^x$ and state space $V_t$ at time t. If it is desired to predict the next server, given that $X_t=x$, if $Z_t^X=1$, define $t_x=\max\{t'<t:X_{t'}=x\}$ to be the most recent time prior to t that the user previously used client x, and let $y'=Y_{t_x}$ be the server used on that occasion. Then, the relevant Dirichlet parameter vector for the row of $P_t^x$ corresponding to the previous server y' given by $$\alpha_{y',y}^x(t) = a_{y',y}^x + \sum_{t'<t} \mathbb{I}(X_{t'} = x, Y_{t'} = y, Y_{t'_x} = y') \quad (9)$$

and hence, from Eq. (2), the predictive distribution for the next server is $$P(Y_t = y \mid X_t = x, Y_{t_x} = y', Z_t^Y = 1, Z_t^X = 1) = \frac{\alpha_{y',y}^x(t)}{\sum_{\tilde{y} \in V_t} \alpha_{y',\tilde{y}}^x(t)} \quad (10)$$

Alternatively, if $Z_t^Y=1$ but $Z_t^X=0$ and so no previous server from client x exists, it is simply assumed that $$P(Y_t = y \mid X_t = x, Y_{t_x} = y', Z_t^Y = 1, Z_t^X = 1) = \frac{1}{|V_t|} \quad (11)$$

The full predictive distribution for the next server given by the current client is $$P(Y_t = y \mid X_t = x, Z_t^Y = z) = \quad (12)$$

$$\sum_{i=0}^{1} \mathbb{P}(Y_t = y \mid X_t = x, Z_t^Y = i, Z_t^X = z) \mathbb{P}(Z_t^Y = i \mid Z_t^X = z)$$

where $\mathbb{P}(Y_t=y|X_t=x, Z_t^Y=i, Z_t^X=z)$ is given by Eq. (8), (10) and (11), respectively.

Event Type Modeling

A model is required for the sequence of event types $E_t$ in some embodiments. Since different computers are generally used for different tasks, it is assumed that each client-server pair has a separate distribution of event types. For a client-server pair (x, y), let $E_1^{x,y}, E_2^{x,y}, \ldots$ be the subsequence of $E_t$ for which $X_t=x$ and $Y_t=y$. Then, each subsequence is assumed to follow the multinomial Dirichlet model discussed above, implying a predictive distribution for the event type, given $X_t=x$ and $Y_t=y$, of $$\mathbb{P}(E_t = e \mid X_t = x, Y_t = y) = \frac{\alpha_e^{x,y}(t)}{\sum_{\tilde{e} \in V_t} \alpha_{\tilde{e}}^{x,y}(t)} \quad (13)$$

where $$\alpha_e^{x,y}(t) = a_e^{x,y} + \sum_{t'<t} \mathbb{I}(X_{t'} = x, Y_{t'} = y, E_{t'} = e) \quad (14)$$

To provide an informative prior, the parameters $\alpha_e^{x,y}$ could be derived from relative global frequencies of each event type occurring on the client-server pair (x, y) across all users in the network.

For simplification, one may consider borrowing strength across the client computers by dropping the dependency on the client so that $\mathbb{P}(E_t=e|X_t=x, Y_t=y)=\mathbb{P}(E_t=e|Y_t=y)$ since the event type more typically depends on the server. For example, if the event type is a logon and it is going to a fileshare computer, then it is usually a network logon, whereas if the event type is a logon and it is to a personal computer, then the event type is usually an interactive logon.

For the computer log data described above, a comparison was made between the models $E_t|X_t, Y_t$ and $E_t|Y_t$ by calculating the Bayes Factor (BF) for the data for each user under the two models. Only 9% of the users had a BF>1 in favor of $E_t|X_t, Y_t$, and of those, the average log BF per event was 1.02. This evidence is "barely worth mentioning" and this simplification is adopted for the results discussed later herein. As mentioned above, some events, such as process starts, may have an extra associated variable that should be modeled, and this may be added using the same model as above, now conditioning $X_t$, $Y_t$, $E_t$.

Event p-Values and Control Chart

Let (x, y, e) be the client-server-event type triple observed at time t, and let $\theta_x(t)$, $\theta_{y|x}(t)$, and $\theta_{e|xy}(t)$ be corresponding realized values taken by the respective predictive distributions of Eq. (7), (12), and (13), respectively. Then strictly speaking, the full posterior predictive p-value is given by $$p_{xye,t} = \sum_{\tilde{x} \in V} \sum_{\tilde{y} \in V} \sum_{\tilde{e} \in E} \theta_{\tilde{x}\tilde{y}\tilde{e}}(t) \mathbb{I}\{\theta_{\tilde{x}\tilde{y}\tilde{e}}(t) \leq \theta_{xye}(t)\} \quad (15)$$

where $\alpha_{xye}(t)=\mathbb{P}(X_t, Y_t, E_t)=\theta_x(t)\theta_{y|x}(t)\theta_{e|xy}(t)$.

For large networks, the above calculation might be too computationally intensive to be of practical value for real time calculations. As an alternative, three independent p-values may be obtained from the conditional distributions $$p_{x,t} = \sum_{\tilde{x} \in V} \theta_{\tilde{x}}(t) \mathbb{I}\{\theta_{\tilde{x}}(t) \leq \theta_x(t)\} \quad (16)$$

$$p_{y|x,t} = \sum_{\tilde{y} \in V} \theta_{\tilde{y}|x}(t) \mathbb{I}\{\theta_{\tilde{y}|x}(t) \leq \theta_{y|x}(t)\} \quad (17)$$

$$p_{e|xy,t} = \sum_{\tilde{e} \in E} \theta_{\tilde{e}|yx}(t) \mathbb{I}\{\theta_{\tilde{e}|yx}(t) \leq \theta_{e|xy}(t)\} \quad (18)$$

Since these p-values are independent, a suitable p-value combiner, such as Fisher's method, can be used to get an overall p-value $p_{xye,t}$. This calculation will scale linearly with the size of the network.

The p-values above are generated from discrete random variables and are thus conservative, meaning that they understate the evidence against the null hypothesis of normal behavior. This effect can be debilitating when multiple p-values are combined. One remedy is to use mid-p-values, which have been shown to have better behavior.

According to the needs of the enterprise network or application, a threshold can be applied directly to the sequence of p-values, alerting when a single p-value falls below that threshold. Alternatively, to accumulate weaker evidence of anomalous behavior over time, a control chart may be deployed on the independent p-value sequence.

Contiguous Subset Selection

Let $p_1, p_2, \ldots$ be a sequence of independent p-values corresponding to a user's behavior over time. One approach for accumulating evidence over time is to take an exponentially weighted moving average, such as $$S_1 = \Phi^{-1}(p_1) \quad (19)$$

$$S_t = \lambda \Phi^{-1}(p_t) + (1-\lambda) S_{t-1}, t > 1 \quad (20)$$

where $\Phi$ is the cumulative distribution function of a standard normal random variable, and the coefficient $\lambda$ represents the degree of weighting decrease. Note that Eq. (20) gives the highest weight to the most recent p-value and then exponentially diminishing weight to past values. As such, this chart has good smoothing properties for tracking a moving average that changes gradually over time.

However, for anomaly detection on a computer network, the task is to detect sudden abrupt changes in behavior, represented by a time-contiguous block of p-values. Furthermore, useful analytics should aim to detect the time at which anomalous behavior began, rather than when it first became detectable. So here, the approach taken is to find the most significant subset of p-values, but now subject to the constraint that the subset is a time-contiguous subsequence.

For t, k≥1, let $$\tilde{s}_{t,k} = \sum_{i=t-k+1}^{t} \log p_i,$$

the logarithm of the product of the k most recent p-values at time t. It was noted by Fisher that when the p-values are independently uniform on [0, 1] then $-2\tilde{s}_{t,k} \sim \chi_{2K}^2$. Thus, the upper tail probability from this distribution, denoted here as $\bar{F}_{2k}(-2\tilde{s}_{t,k})$, gives a well calibrated measure of surprise in the k most recent p-values. The smaller the value of $\bar{F}_{2k}(-2\tilde{s}_{t,k})$, the more anomalous the last k p-values have been.

The control chart in this analysis monitors the minimum of these quantities with respect to the unknown anomalous subset size k at time t, $$\tilde{S}_t = \min_{1 \leq k \leq \min\{k_{max}, t\}} \bar{F}_{2k}(-2\tilde{s}_{t,k}) \quad (21)$$

Viewed over time, the lowest point $$\operatorname{argmin}_t \tilde{S}_t \quad (22)$$

for a user corresponds to the end of the most anomalous contiguous subsequence of p-values. The corresponding, minimizing k at that time point indicates the duration of the anomalous period, and hence, when the anomaly began. By default, the chart parameter $k_{max} = \infty$, but otherwise, this can be set to an upper bound on the size of an anomalous subset of p-values. In the results section below, it was chosen that $k_{max} = 20$ since this should be sufficient for detecting anomalous computer network behavior and greatly reduces the computational burden of calculating the chart. The p-values for the test statistic $\tilde{S}_t$ may be obtained via Monte Carlo methods.

Results

As mentioned above, for the purposes of demonstration, a random selection of 1053 user credentials was selected from the LANL computer log data plus the additional 78 credentials that were known to be compromised during the second month of data where there was a known red team attack. For the prior probabilities for the models described above, in all cases, a symmetric Dirichlet prior was chosen with all Dirichlet parameter components equal to one. Events were only scored for the second month of data, during which the red team attack occurred. A minimum training period of 7 days was set for the users so that events generated by a user credential are not scored until the user had been observed for a full week. Further, any events involving computers that have not been observed for at least a day were not scored.

To test for model fit, a Kolmogorov-Smirnov (KS) test was performed for the set of p-values observed over the first month of data for each user credential, under the null hypothesis that they are distributed as uniform random variables on the unit interval. As discrete p-values are stochastically larger than uniform, only a one-sided KS test was performed. At a 5% significance level, the null hypothesis was rejected for 6% of users, which is close to the target of 5%.

Figure 4B:
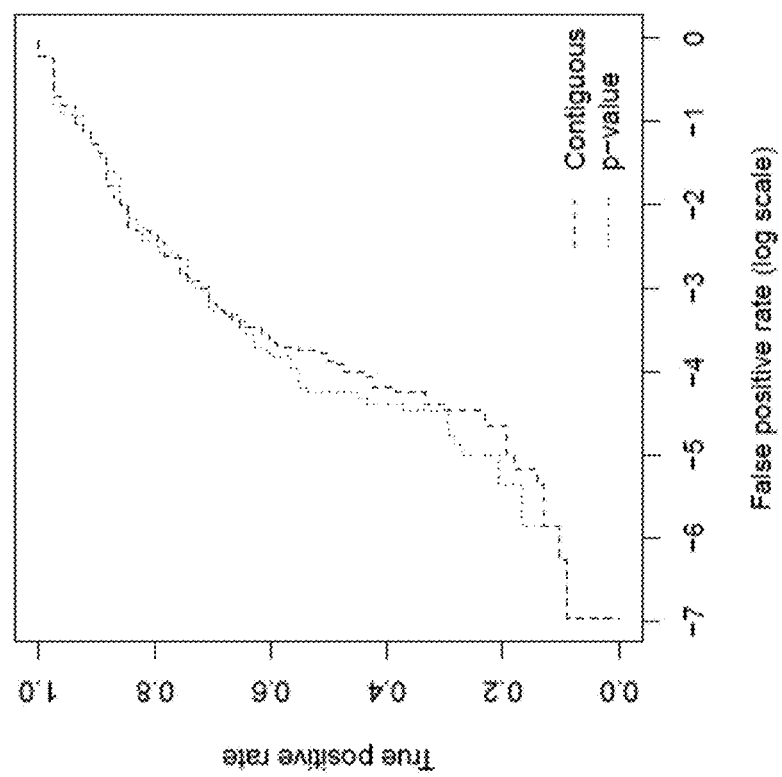
FIG. 4B is a ROC curve where the false positive rate is on the log scale, according to an embodiment of the present invention.
Figure 4A:
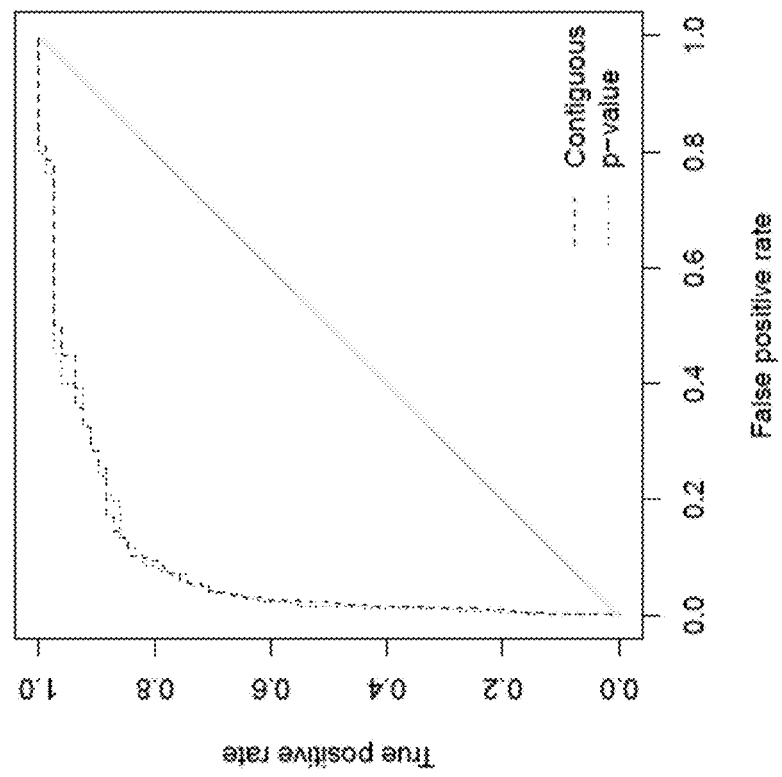
FIG. 4A is a ROC curve for the minimum p-values for and the minimum scores for the contiguous subset control chart for each user, according to an embodiment of the present invention.

FIGS. 4A and 4B show receiver operating characteristic (ROC) curves 400, 410 over varying thresholds for the sequence of p-values given by Eq. (15) and the scores obtained using the contiguous control chart per Eq. (21), illustrating the performance of the methodology under the two approaches. For the ROC curves, a user credential was considered detected at a threshold if at any point over the month it dropped below that threshold at least once.

Figure 5:
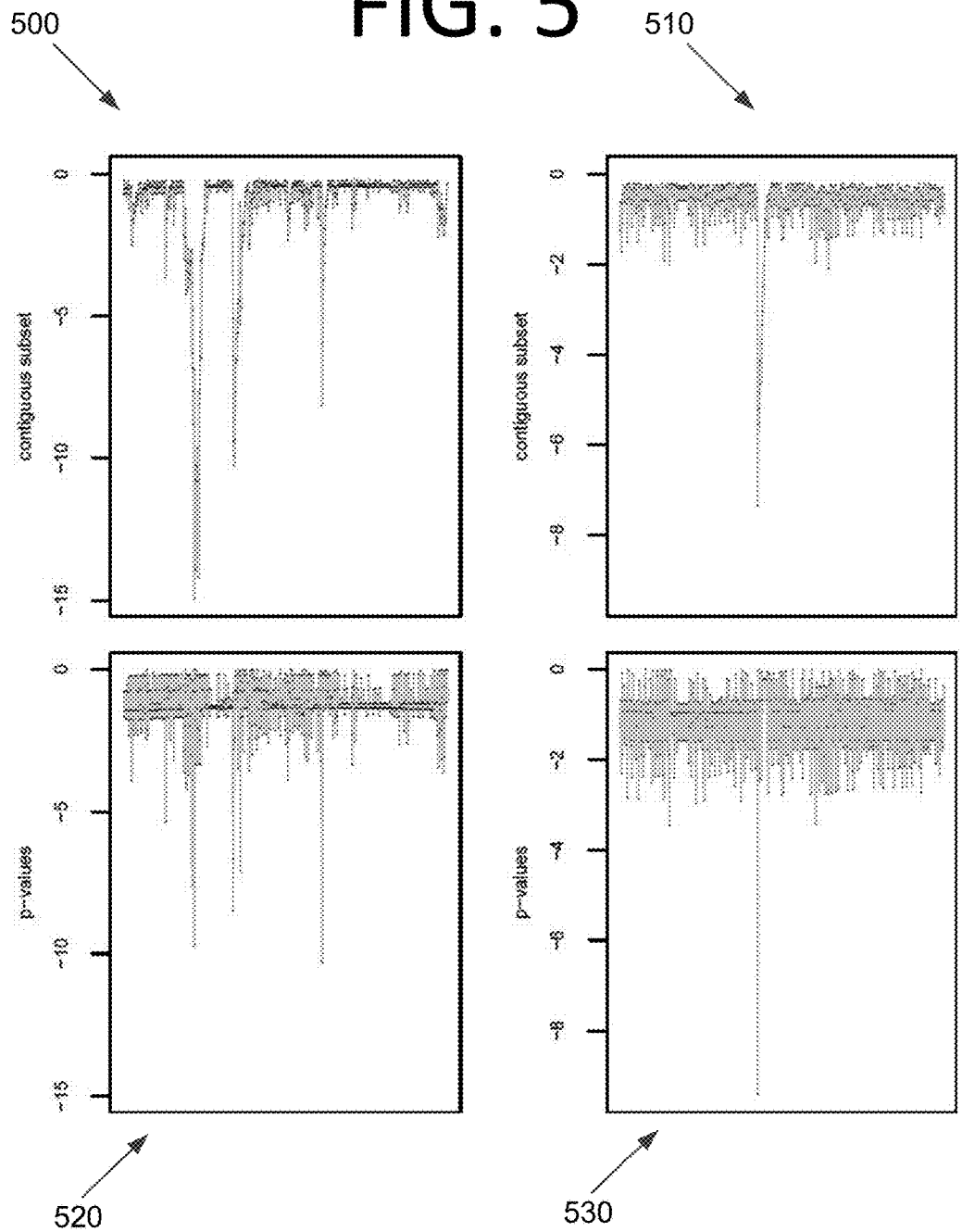
FIG. 5 illustrates contiguous control chart p-values (top) and individual p-values (bottom) on the log scale for two known compromised user credentials, according to an embodiment of the present invention.

Scoring on either the individual p-values or the control chart led to very similar performance, with a very high true positive to false positive ratio over low thresholds. When plotting the ROC curve on the log scale, it can be seen that scoring on the individual p-values performs slightly better at certain thresholds, suggesting that there is little to be gained in these examples from accumulating evidence over time. Indeed, from further investigation of the data, the nature of the red team attack present in the data was such that the user credentials that were compromised were mostly used in an extremely anomalous way only once, rather than repeatedly. The individual p-values will be lower than the control chart p-values for one-off anomalous events, and hence will be detected at a lower threshold. The difference between the two approaches in practice is illustrated in FIG. 5, which shows the scores on the log scale for both approaches when applied to two of the known compromised user credentials. For the user on the left of FIG. 5 (plots 500, 520), when there is a sequence of anomalous events, the score using the control chart is much lower than that of the individual p-values. When there is a one-off anomalous event, as can be seen for the user on the right (plots 510, 530), the individual p-value approach will have a lower score.

Figure 6A:
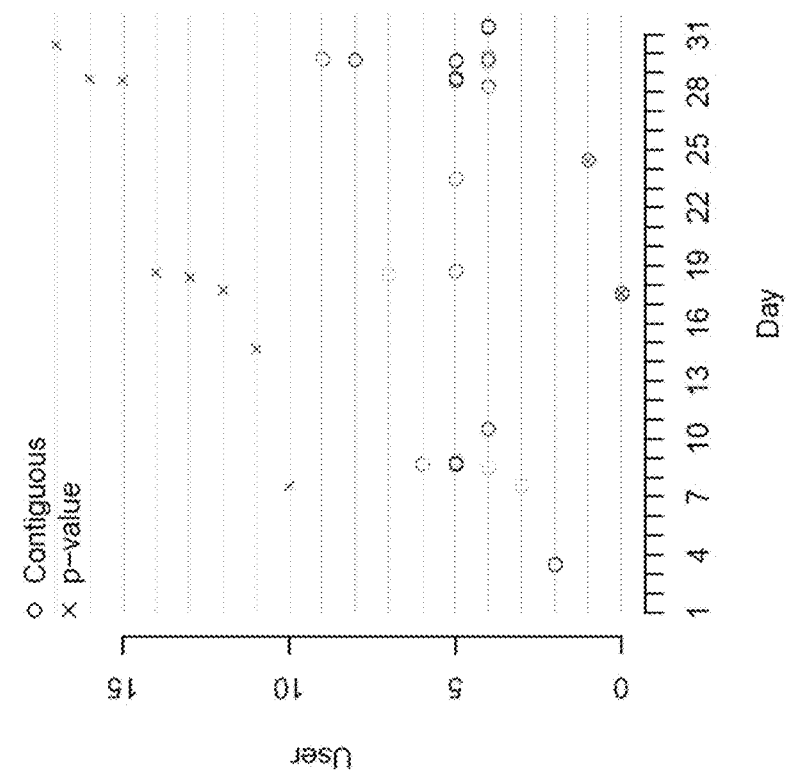
FIG. 6A is a graph illustrating times at which anomalous behavior was detected for true alarms, according to an embodiment of the present invention.
Figure 6B:
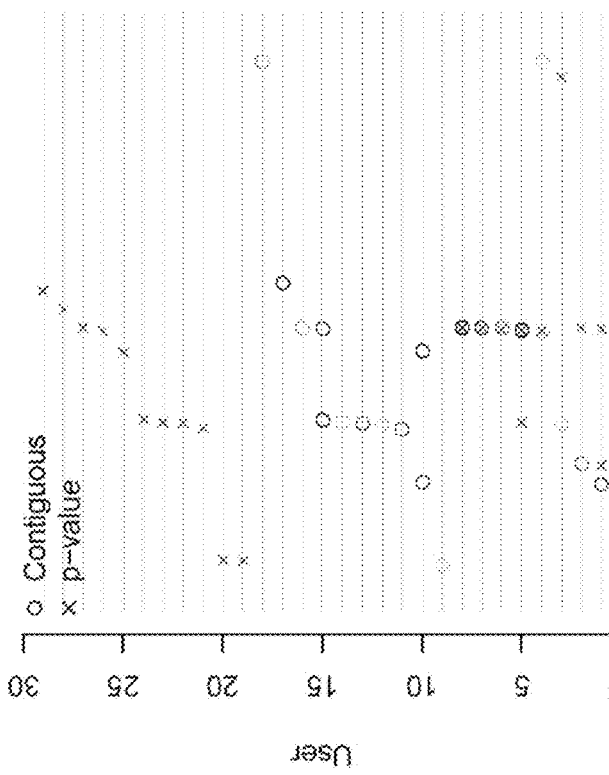
FIG. 6B is a graph illustrating times at which anomalous behavior was detected for false alarms, according to an embodiment of the present invention.

Graphs 600, 610 of FIGS. 6A and 6B show the timings at which users were flagged for both the control chart and individual p-value approaches at thresholds chosen such that both had the same number of false alarms. Graph 600 shows user credentials that were known to be compromised, and hence contains more true positives. Graph 610 shows the user credentials that were false alarms. It is apparent from graphs 600, 610 that there is a much higher correlation between the timings of the anomalous events for the true positives than the false positives. Therefore, to reduce false alarms it may be desirable to look for correlations in timings of anomalous events.

Exploring correlations between client computers and server computers for anomalous events across different users could further reduce false alarms. Such considerations are also suited for detecting network intruders as well as insider threats, as attackers often use more than one compromised computer in the network as the base of their operations, or alternatively, if they have a target within the network, they may use various compromised credentials to try and obtain access to that computer. For the red team attack in the data analyzed here, 65 out of the 444 anomalous events detected at a chosen threshold all originated from the same client involving 40 different user credentials that were all known to be compromised. The next most common client only had 16 anomalous events associated with it involving only 1 user credential, and the rest were spread out over different computers. Similarly, for the servers, the flagged anomalous events were spread out over different computers.

More General Approach

The exact specifics of the model discussed above are not included in all embodiments. In some embodiments, a client user computer set $V_t^X \subset V$ and a server user computer set $V_t^Y \subset V$ is defined as the subset of computers in the network that a user has used in some relatively recent past period (e.g., last two weeks, last three months, etc.) before time t as a client or server, respectively. Note that over time, $V_t^X$ and $V_t^Y$ may change and how often a user computer set is updated may be guided by a security analyst.

Since the client, server, and event type of a user authentication are all categorical variables within the Bayesian paradigm, these variables may be most simply modeled by multinomial distributions with conjugate Dirichlet distribution priors (referred to as Multinomial-Dirichlet distributions), as noted above, for the category probabilities. To address the task of anomaly detection, interest in this example is centered on the predictive distributions from this model pair at each time step.

Given the client and server are in the user computer set defined above, the variables $X_t$ and $Y_t$ are modeled using the Multinomial-Dirichlet distribution. If the client and server are not in the user computer set, representing that a user has used a new client or server computer, then a separate distribution is defined based on the propensity of networked computers being used by multiple users. The reason for choosing this model for new user connections is that intuitively, networked computers with a large number of users connecting from or to them are more likely to have new users connect from or to them. As with the above, if (x, y, e) is the client-server-event type triple observed at time t, and $\theta_{xye}(t) = P(X_t = x, Y_t = y, E_t = e)$ is the predictive probability, then strictly speaking, the full posterior predictive p-value is given by Eq. (15) above. In some embodiments, the joint distribution may be factorized as $\theta_{xye}(t) = P(X_t, Y_t, E_t) = \theta_e(t) \theta_{x|e}(t) \theta_{y|ex}(t)$.

Figure 7:
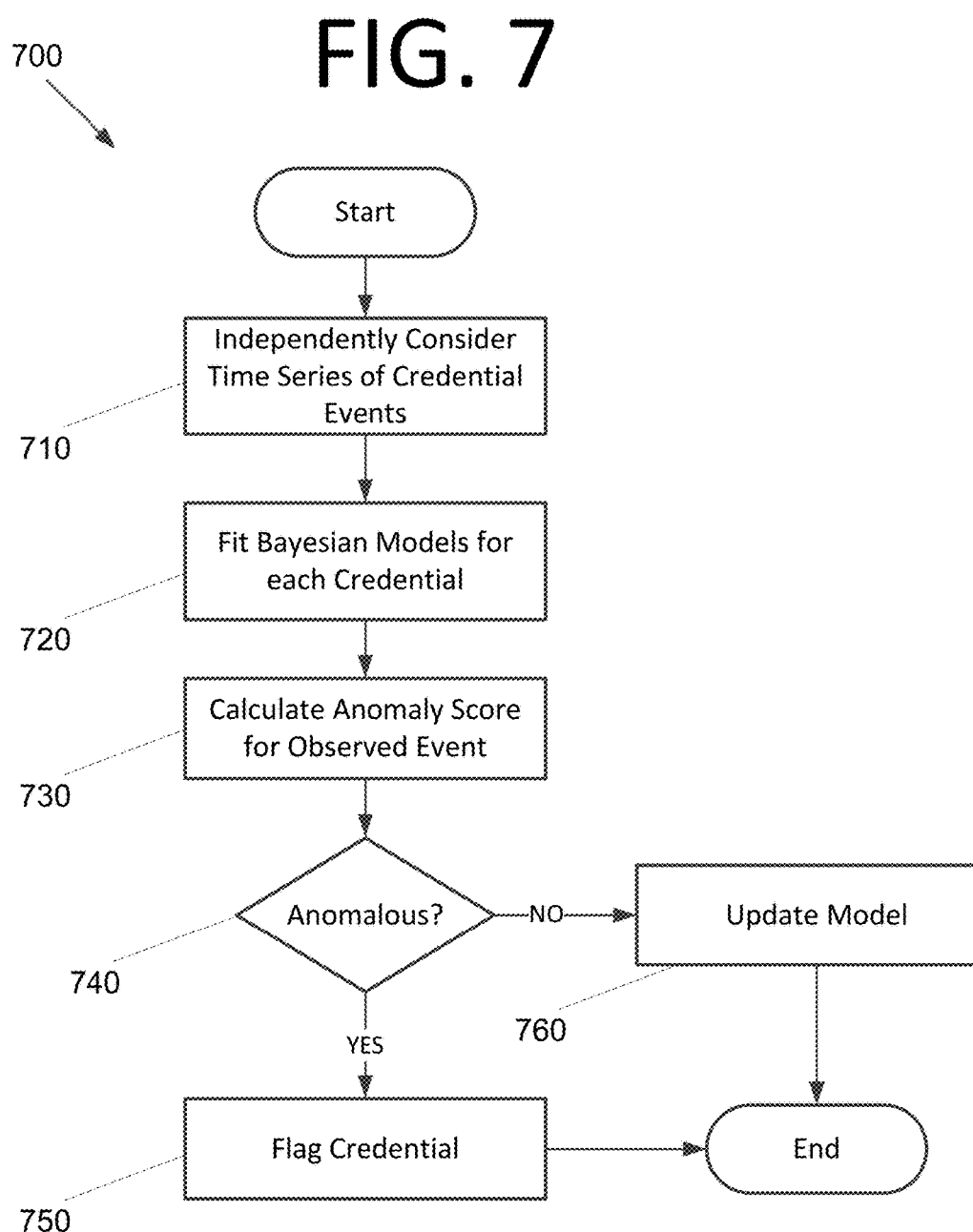
FIG. 7 is a flowchart illustrating a process for modeling log events in a network using event logs, according to an embodiment of the present invention.

FIG. 7 is a flowchart 700 illustrating a process for modeling log events in a network using event logs, according to an embodiment of the present invention. The process begins with independently considering a time series of events generated by each user credential at 710. For instance, each tuple (U, X, Y, E) may be considered over a certain time period. Bayesian models are fit to the time series of events for each user credential at 720. The system then calculates an anomaly score for each credential at 730. When the anomaly score indicates that an event associated with a credential is anomalous at 740, the system then flags the credential as being associated with anomalous behavior at 750. If the credential is not flagged as anomalous at 740, then the Bayesian model is updated for that credential at 760.

In some embodiments, the user credential, client computing system, server computing system, and event type may be scored and considered in the Bayesian model. In certain embodiments, the client, server, and event type of a user authentication are modeled by multinomial distributions with conjugate Dirichlet distribution priors for the category probabilities. In some embodiments, a sequence of computer events for a user is modeled as a Markov Chain with a time-varying state space and a transition probability matrix. In some embodiments, p-values are obtained and combined to obtain an overall p-value from which anomalous behavior is determined. In some embodiments, a control chart is used in addition to or in lieu of applying a threshold.

Figure 8:
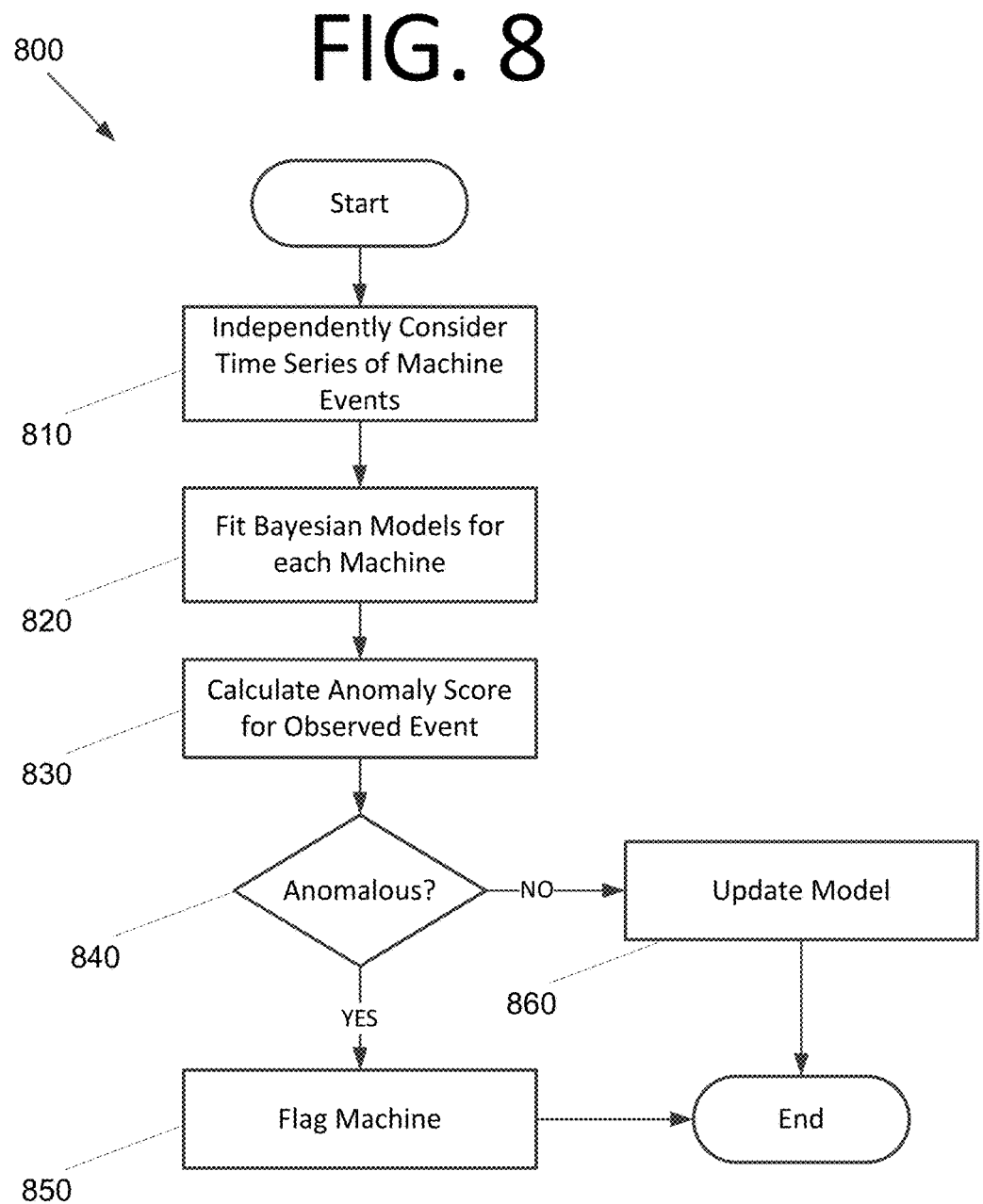
FIG. 8 is a flowchart illustrating a process for modeling machine level events, according to an embodiment of the present invention.

FIG. 8 is a flowchart 800 illustrating a process for modeling machine level events, according to an embodiment of the present invention. The process begins with independently considering a time series of events generated by each machine at 810. Bayesian models are fit to the time series of events for each machine at 820. The system then calculates an anomaly score for each machine at 830. When the anomaly score indicates that an event associated with a credential is anomalous at 840, the system then flags the machine as being associated with anomalous behavior at 850. If the machine is not flagged as anomalous at 840, the model is updated for that machine at 860.

Figure 9:
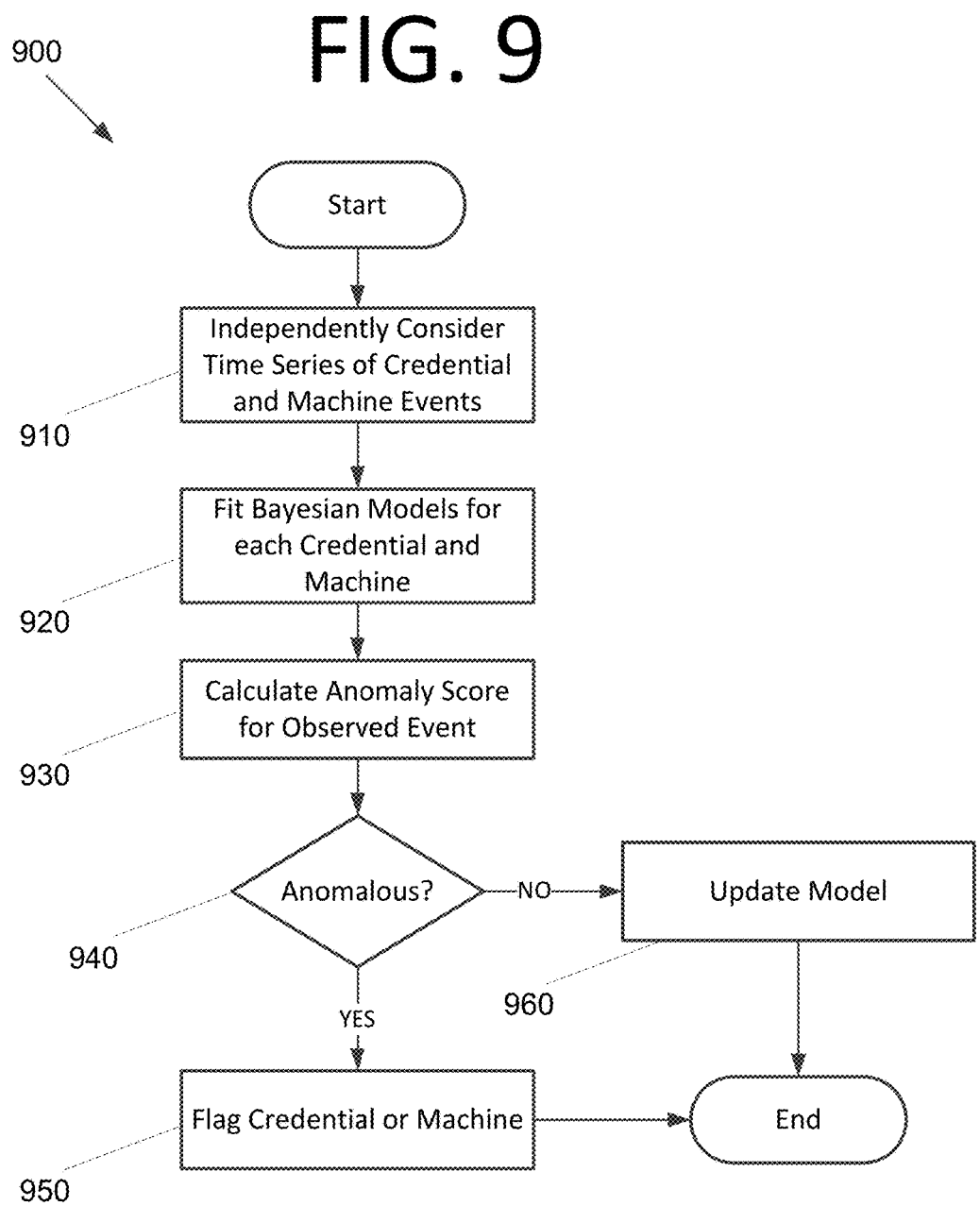
FIG. 9 is a flowchart illustrating a process for modeling both user log events and machine level events, according to an embodiment of the present invention.

FIG. 9 is a flowchart 900 illustrating a process for modeling both user log events and machine level events, according to an embodiment of the present invention. The process begins with independently considering a time series of events generated by each user credential and machine at 910. Bayesian models are fit to the time series of events for each user credential and machine at 920. The system then calculates an anomaly score for each credential and machine at 930. When the anomaly score indicates that an event associated with a credential or machine is anomalous at 940, the system then flags the credential or machine as being associated with anomalous behavior at 950. If the credential or machine is not flagged as anomalous at 940, the model is updated for that credential or machine at 960.

Figure 10:
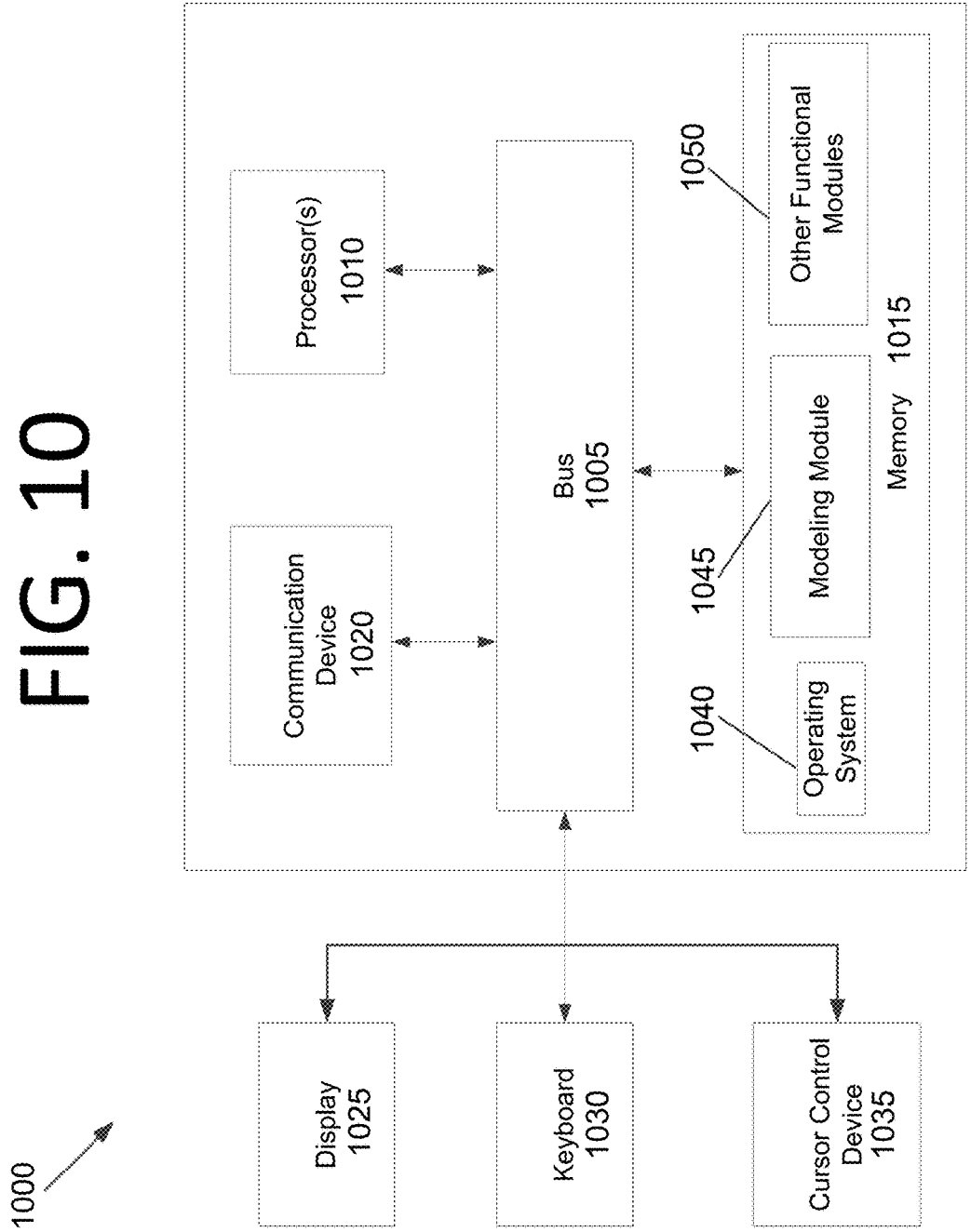
FIG. 10 is a block diagram illustrating a computing system configured to model event logs in a network, according to an embodiment of the present invention.

FIG. 10 is a block diagram illustrating a computing system 1000 configured to model user credentials from event logs in a network, according to an embodiment of the present invention. Computing system 1000 includes a bus 1005 or other communication mechanism for communicating information, and processor(s) 1010 coupled to bus 1005 for processing information. Processor(s) 1010 may be any type of general or specific purpose processor, including a central processing unit ("CPU") or application specific integrated circuit ("ASIC"). Processor(s) 1010 may also have multiple processing cores, and at least some of the cores may be configured to perform specific functions. Multi-parallel processing may be used in some embodiments. Computing system 1000 further includes a memory 1015 for storing information and instructions to be executed by processor(s) 1010. Memory 1015 can be comprised of any combination of random access memory (RAM), read only memory (ROM), flash memory, cache, static storage such as a magnetic or optical disk, or any other types of non-transitory computer-readable media or combinations thereof. Additionally, computing system 1000 includes a communication device 1020, such as a transceiver and antenna, to wirelessly provide access to a communications network.

Non-transitory computer-readable media may be any available media that can be accessed by processor(s) 1010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1010 are further coupled via bus 1005 to a display 1025, such as a Liquid Crystal Display (LCD), for displaying information to a user. A keyboard 1030 and a cursor control device 1035, such as a computer mouse, are further coupled to bus 1005 to enable a user to interface with computing system. However, in certain embodiments such as those for mobile computing implementations, a physical keyboard and mouse may not be present, and the user may interact with the device solely through display 1025 and/or a touchpad (not shown). Any type and combination of input devices may be used as a matter of design choice.

Memory 1015 stores software modules that provide functionality when executed by processor(s) 1010. The modules include an operating system 1040 for computing system 1000. The modules further include a modeling module 1045 that is configured to model user behavior from event logs using any of the approaches discussed herein or derivatives thereof. Computing system 1000 may include one or more additional functional modules 1050 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 7-9 may be performed by a computer program, encoding instructions for the nonlinear adaptive processor to perform at least the processes described in FIGS. 7-9, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 7-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

A framework is provided in some embodiments for modeling the activity surrounding user credentials on a computer network using computer event logs by viewing the logs attributed to each user as a multivariate data stream. The methodology was shown to perform well in detecting compromised user credentials at a very low false positive rate. Further modeling effort may be employed to incorporate the time stamps of the event logs, as well as more sophisticated models for the occurrence of new computer usage from user credentials. In the example used herein, the same threshold was used for detecting anomalous credentials across all users and this can bias detection towards the busier users in the network who generate more events per day. Ideally, a threshold should be chosen that takes into account how many events each user credential generates so that there is an equal probability of detecting different kinds of users.

From a data processing standpoint, more effort in understanding and separating automated events from human-driven events may be beneficial. Incorporating other potential data sources that can be tied to user credentials, such as badge reader data, proxy data, and/or email metadata may aid in further understanding users' behavior, in particular by identifying when they are physically present on the network. Additionally, a separate modeling endeavor for new account creation and local machine accounts may extend the breadth of monitoring within the network.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    independently considering a time series of events generated by a plurality of user credentials, by a monitoring computing system, the time series of events comprising log events for each user credential, the log events comprising a client computing system, a server computing system, and an event type;
    fitting Bayesian models to the time series of events, by the monitoring computing system, for each of the plurality of user credentials;
    determining, by the monitoring computing system, p-values for the client computing system, the server computing system, and the event type for each of the plurality of user credentials based on the respective fitted Bayesian model;
    combining the determined p-values, by the monitoring computing system, to obtain a full posterior predictive p-value or an overall p-value;
    checking, by the computing system, whether an event generated for a given user credential is anomalous with respect to the respective full posterior predictive p-value or overall p-value for that given user credential; and
    when the event for the given user credential is anomalous based on the full posterior predictive p-value or overall p-value, flagging the given user credential as associated with anomalous behavior, by the monitoring computing system.

2. The computer-implemented method of claim 1, further comprising:
    when the given user credential is not anomalous, updating the fitted Bayesian model for that credential, by the monitoring computing system.

3. The computer-implemented method of claim 1, wherein event types comprise ticket granting ticket requests, service ticket requests, network logons, process starts, interactive logons, remote interactive sessions, remote desktop sessions, credential mapping, service startups, or any combination thereof.

4. The computer-implemented method of claim 1, further comprising:
    removing, by the monitoring computing system, duplicate log events, where a time stamp, user credential, client computing system, server computing system, and event type are all identical to a previous event log.

5. The computer-implemented method of claim 1, wherein the client computing system, the server computing system, and the event type are modeled by multinomial distributions with conjugate Dirichlet distribution priors.

6. The computer-implemented method of claim 1, wherein the time series of events for each user credential is modeled as a Markov Chain with a time-varying state space and a transition probability matrix.

7. The computer-implemented method of claim 1, wherein the checking of whether the event is anomalous further comprises:
    using a control chart, by the monitoring computing system, to accumulate evidence of anomalous behavior over time.

8. The computer-implemented method of claim 1, wherein the checking of whether the event is anomalous further comprises:
    applying an alarm threshold, by the monitoring computing system, to control a false alarm rate.

9. The computer-implemented method of claim 1, further comprising:
    independently considering, by the monitoring computing system, a time series of machine level events generated by a plurality of monitored computing systems in a network;
    fitting Bayesian models to the time series of events, by the monitoring computing system, for each of the plurality of monitored computing systems in the network;
    checking, by the monitoring computing system, whether a machine level event generated for a given monitored computing system is anomalous with respect to the fitted Bayesian model; and
    when the machine level event is anomalous, flagging the monitored computing system associated with the anomalous event as exhibiting anomalous behavior, by the monitoring computing system.

10. The computer-implemented method of claim 1, wherein for a client-server-event type triple (x, y, e) for the client computing system x, the server computing system y, and the event e observed at a time t, the full posterior predictive p-value is given by:

$$p_{xye,t} = \sum_{\tilde{x} \in V} \sum_{\tilde{y} \in V} \sum_{\tilde{e} \in E} \theta_{\tilde{x}\tilde{y}\tilde{e}}(t) \mathbb{1}\{\theta_{\tilde{x}\tilde{y}\tilde{e}}(t) \leq \theta_{xye}(t)\}$$

where $\theta_x(t)$, $\theta_{y|x}(t)$, and $\theta_{e|xy}(t)$ are corresponding realized values for the client computing system, the server computing system, and the event, respectively, taken from predictive distributions for each, and $\theta_{xye}(t) = \mathbb{P}(X_t, Y_t, E_t) = \theta_x(t)\theta_{y|x}(t)\theta_{e|xy}(t)$.

11. The computer-implemented method of claim 1, wherein for a client-server-event type triple (x, y, e) for the client computing system x, the server computing system y, and the event e observed at a time t, the overall p-value is derived by combining conditional distributions $p_{x,t}$, $p_{y|x,t}$ and $p_{e|xy,t}$ for the client computing system, the server computing system, and the event, respectively, the conditional distributions given by:

$$p_{x,t} = \sum_{\tilde{x} \in V} \theta_{\tilde{x}}(t) \mathbb{1}\{\theta_{\tilde{x}}(t) \leq \theta_x(t)\}$$

$$p_{y|x,t} = \sum_{\tilde{y} \in V} \theta_{\tilde{y}|x}(t) \mathbb{1}\{\theta_{\tilde{y}|x}(t) \leq \theta_{y|x}(t)\}$$

$$p_{e|xy,t} = \sum_{\tilde{e} \in E} \theta_{\tilde{e}|yx}(t) \mathbb{1}\{\theta_{\tilde{e}|yx}(t) \leq \theta_{e|xy}(t)\}$$

where $\theta_x(t)$, $\theta_{y|x}(t)$, and $\theta_{e|xy}(t)$ are corresponding realized values for the client computing system, the server computing system, and the event, respectively.

12. A computer-implemented method, comprising:
independently considering, by a monitoring computing system, a time series of machine level events generated by a plurality of monitored computing systems in a network, the time series of machine level events comprising log events for the plurality of monitored computing systems in the network, the log events comprising a client computing system, a server computing system, and an event type;
fitting Bayesian models to the time series of events, by the monitoring computing system, for each of the plurality of monitored computing systems in the network;
determining, by the monitoring computing system, p-values for the client computing system, the server computing system, and the event type for each of the plurality of machine level events based on the respective fitted Bayesian model;
combining the determined p-values, by the monitoring computing system, to obtain a full posterior predictive p-value or an overall p-value;
checking, by the monitoring computing system, whether an event generated for a given monitored computing system is anomalous with respect to the respective full posterior predictive p-value or overall p-value; and
when the event is anomalous based on the full posterior predictive p-value or overall p-value, flagging the monitored computing system associated with the anomalous event as exhibiting anomalous behavior, by the monitoring computing system.

13. The computer-implemented method of claim 12, further comprising:
when the given event is not anomalous, updating, by the monitoring computing system, the fitted Bayesian model for the monitored computing system associated with the event.

14. The computer-implemented method of claim 12, wherein the client computing system, the server computing system, and the event type are modeled by multinomial distributions with conjugate Dirichlet distribution priors.

15. The computer-implemented method of claim 12, wherein for a client-server-event type triple (x, y, e) for the client computing system x, the server computing system y, and the event e observed at a time t, the full posterior predictive p-value is given by:

$$p_{xye,t} = \sum_{\tilde{x} \in V} \sum_{\tilde{y} \in V} \sum_{\tilde{e} \in E} \theta_{\tilde{x}\tilde{y}\tilde{e}}(t) \mathbb{1}\{\theta_{\tilde{x}\tilde{y}\tilde{e}}(t) \leq \theta_{xye}(t)\}$$

where $\theta_x(t)$, $\theta_{y|x}(t)$, and $\theta_{e|xy}(t)$ are corresponding realized values for the client computing system, the server computing system, and the event, respectively, taken from predictive distributions for each, and $\theta_{xye}(t) = \mathbb{P}(X_t, Y_t, E_t) = \theta_x(t)\theta_{y|x}(t)\theta_{e|xy}(t)$.

16. The computer-implemented method of claim 12, wherein for a client-server-event type triple (x, y, e) for the client computing system x, the server computing system y, and the event e observed at a time t, the overall p-value is derived by combining conditional distributions $p_{x,t}$, $p_{y|x,t}$ and $p_{e|xy,t}$ for the client computing system, the server computing system, and the event, respectively, the conditional distributions given by:

$$p_{x,t} = \sum_{\tilde{x} \in V} \theta_{\tilde{x}}(t) \mathbb{1}\{\theta_{\tilde{x}}(t) \leq \theta_x(t)\}$$

$$p_{y|x,t} = \sum_{\tilde{y} \in V} \theta_{\tilde{y}|x}(t) \mathbb{1}\{\theta_{\tilde{y}|x}(t) \leq \theta_{y|x}(t)\}$$

$$p_{e|xy,t} = \sum_{\tilde{e} \in E} \theta_{\tilde{e}|yx}(t) \mathbb{1}\{\theta_{\tilde{e}|yx}(t) \leq \theta_{e|xy}(t)\}$$

where $\theta_x(t)$, $\theta_{y|x}(t)$, and $\theta_{e|xy}(t)$ are corresponding realized values for the client computing system, the server computing system, and the event, respectively.

17. A computer-implemented method, comprising:
independently considering, by a computing system, a time series of events generated by a plurality of user credentials and a plurality of monitored computing systems in a network, the time series of events comprising log events for each user credential and each monitored computing system of the plurality of monitored computing systems, the log events comprising a client computing system, a server computing system, and an event type;
fitting Bayesian models to the time series of events for each of the plurality of user credentials and each of the plurality of monitored computing systems in the network;
determining, by the monitoring computing system, p-values for the client computing system, the server computing system, and the event type for each of the plurality of user credentials and each of the plurality of machine level events based on the respective fitted Bayesian model;
combining the determined p-values, by the monitoring computing system, to obtain a full posterior predictive p-value or an overall p-value;
checking, by the computing system, whether an event generated for a given user credential or a given monitored computing system of the plurality of monitored computing systems is anomalous with respect to the respective full posterior predictive p-value or overall p-value for the given user credential or machine level event; and
when the event is anomalous based on the full posterior predictive p-value or overall p-value, flagging, by the monitoring computing system, the given user credential or the given monitored computing system of the plurality of monitored computing systems as associated with anomalous behavior.

18. The computer-implemented method of claim 17, further comprising:
when the event is not anomalous, updating, by the monitoring computing system, the fitted Bayesian model for the given credential or the given monitored computing system of the plurality of monitored computing systems.

19. The computer-implemented method of claim 17, wherein for a client-server-event type triple (x, y, e) for the client computing system x, the server computing system y, and the event e observed at a time t, the full posterior predictive p-value is given by:

$$p_{xye,t} = \sum_{\tilde{x} \in V} \sum_{\tilde{y} \in V} \sum_{\tilde{e} \in E} \theta_{\tilde{x}\tilde{y}\tilde{e}}(t) \mathbb{I}\{\theta_{\tilde{x}\tilde{y}\tilde{e}}(t) \leq \theta_{xye}(t)\}$$

where $\theta_x(t)$, $\theta_{y|x}(t)$, and $\theta_{e|xy}(t)$ are corresponding realized values for the client computing system, the server computing system, and the event, respectively, taken from predictive distributions for each, and $\theta_{xye}(t) = \mathbb{P}(X_t, Y_t, E_t) = \theta_x(t)\theta_{y|x}(t)\theta_{e|xy}(t)$.

20. The computer-implemented method of claim 17, wherein for a client-server-event type triple (x, y, e) for the client computing system x, the server computing system y, and the event e observed at a time t, the overall p-value is derived by combining conditional distributions $p_{x,t}$, $p_{y|x,t}$ and $p_{e|xy,t}$ for the client computing system, the server computing system, and the event, respectively, the conditional distributions given by:

$$p_{x,t} = \sum_{\tilde{x} \in V} \theta_{\tilde{x}}(t) \mathbb{I}\{\theta_{\tilde{x}}(t) \leq \theta_x(t)\}$$

$$p_{y|x,t} = \sum_{\tilde{y} \in V} \theta_{\tilde{y}|x}(t) \mathbb{I}\{\theta_{\tilde{y}|x}(t) \leq \theta_{y|x}(t)\}$$

$$p_{e|xy,t} = \sum_{\tilde{e} \in E} \theta_{\tilde{e}|yx}(t) \mathbb{I}\{\theta_{\tilde{e}|yx}(t) \leq \theta_{e|xy}(t)\}$$

where $\theta_x(t)$, $\theta_{y|x}(t)$, and $\theta_{e|xy}(t)$ are corresponding realized values for the client computing system, the server computing system, and the event, respectively.

* * * * *